United States Patent
Grosjacques et al.

(10) Patent No.: US 7,884,897 B2
(45) Date of Patent: Feb. 8, 2011

(54) LIQUID CRYSTAL DISPLAY DEVICE DISPLAYING COLOURED SEGMENTS AND TIMEPIECE FITTED WITH THE SAME

(75) Inventors: Emile Grosjacques, Saint-Blaise (CH); Pascal Winkler, Saint-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 169 days.

(21) Appl. No.: 12/280,188

(22) PCT Filed: Feb. 20, 2007

(86) PCT No.: PCT/EP2007/051619

§ 371 (c)(1),
(2), (4) Date: Feb. 18, 2009

(87) PCT Pub. No.: WO2007/096358

PCT Pub. Date: Aug. 30, 2007

(65) Prior Publication Data
US 2009/0245031 A1    Oct. 1, 2009

(30) Foreign Application Priority Data
Feb. 27, 2006    (EP)    ................................. 06110432

(51) Int. Cl.
*G02F 1/1335* (2006.01)
(52) U.S. Cl. ........................ 349/65; 349/113; 349/142
(58) Field of Classification Search ........................ None
See application file for complete search history.

(56) References Cited
U.S. PATENT DOCUMENTS

| 6,467,923 | B1 | 10/2002 | Umemoto | |
| 6,671,013 | B1 * | 12/2003 | Ohkawa | 349/62 |
| 7,384,173 | B2 * | 6/2008 | Whitney | 362/330 |
| 7,447,417 | B2 * | 11/2008 | Uemoto | 385/146 |
| 2002/0044436 | A1 | 4/2002 | Ohkawa | |
| 2002/0054488 | A1 | 5/2002 | Ohkawa | |
| 2002/0175632 | A1 | 11/2002 | Takeguchi | |

FOREIGN PATENT DOCUMENTS

| EP | 1 072 907 A1 | 1/2001 |
| JP | 3-217818 | 9/1991 |

OTHER PUBLICATIONS

International Search Report issued in corresponding application No. PCT/EP2007/051619, completed May 8, 2007 and May 18, 2007.

\* cited by examiner

*Primary Examiner*—Tina M Wong
(74) *Attorney, Agent, or Firm*—Griffin & Szipl, P.C.

(57) ABSTRACT

The invention proposes a liquid crystal (38) display device (12) including a liquid crystal (38) cell (30), a control unit (26), and a backlighting module (48) including at least a first (50) and a second (52) light source of different colours which transmit light rays (Rr, Rb) inside a light guide (54), characterized in that the light guide (54) includes a plurality of prisms (64, 66) which deflect the light rays (Rr, Rb) towards the display face (28), a first series (S1) of prisms (64, 66) being orientated towards the first light source (50) and a second series (S2) of prisms (52) being orientated towards the second light source (52), and in that the prisms (64, 66) are distributed in zones of the light guide (54) which are located underneath the electrodes (40). The invention also proposes a timepiece (10) fitted with this device (12).

14 Claims, 2 Drawing Sheets

LIQUID CRYSTAL DISPLAY DEVICE DISPLAYING COLOURED SEGMENTS AND TIMEPIECE FITTED WITH THE SAME

This is a National Phase Application in the United States of International Patent Application No. PCT/EP2007/051619 filed Feb. 20, 2007, which claims priority on European Patent Application No. 06110432.9, filed Feb. 27, 2006. The entire disclosures of the above patent applications are hereby incorporated by reference.

FIELD OF THE INVENTION

The present invention concerns a liquid crystal display device of the type with segment display and a timepiece comprising this display device, particularly a wristwatch.

BACKGROUND OF THE INVENTION

This type of display device, in which the display face is considered to be orientated upwards, includes in particular:
- a liquid crystal cell comprising at least a top substrate and a bottom substrate, at least two electrodes and at least one counter-electrode which are structured on the opposite faces of the two substrates, each electrode representing a figurative pattern or a portion of a figurative pattern,
- a control unit which controls the liquid crystal cell by applying a control voltage of determined value between a selected electrode and the counter-electrode so as to alter the orientation of the liquid crystals and to cause the display of the corresponding figurative patterns, and
- a backlighting module, arranged under the liquid crystal cell, on the side opposite to the display face, comprising at least a first and a second light source of different colours, which transmit light rays inside at least one light guide.

This type of display device has the advantage of being inexpensive, since the technology used for the liquid crystal cell, called the segment display, is simple and tested. It uses electrodes in the shape of segments of characters which allows a simplified electronic circuit to be used, the powering of each electrode or segment being directly controlled in an all or nothing mode, and the counter-electrode, generally in the form of a plate, being earthed. Control of this type of liquid crystal cell does not therefore require the lines and columns to be scanned, as in a matrix type display, which, in addition to simplifying the electronic control circuit, makes the display patterns easier to read.

Generally, liquid crystal segment display cells are monochrome. The display segments appear for example in black, when a reflective film is placed under the cell and said segments are powered to prevent light being reflected onto the display face. The display segments can also appear in the colour of the light source of the backlighting module.

In order to increase the display possibilities and improve aesthetic appearance, it has been proposed to make the display device multicoloured by using a backlighting module comprising several light sources of different transmission colours.

A display device of this type is disclosed in JP Patent No 3217818 A. In this document, the segment display control, character display control and light source lighting control are synchronised via a central control circuit so as to allow each segment to be successively displayed in one of the colours.

This solution is not completely satisfactory since it requires a complicated electronic control circuit to achieve synchronisation. Moreover, at any given instant, all of the displayed segments are lit with the same colour, or the same mixture of colour obtained by lighting several sources simultaneously.

It is an object of the present invention to overcome the aforecited drawbacks by proposing a display device that it simpler to manufacture and simpler to control. It is also an object of the present invention to propose a display device having an improved light output and thus improved legibility of the patterns to be displayed.

SUMMARY OF THE INVENTION

The invention thus proposes a display device of the previously described type, characterized in that at least one face of the light guide is provided with prisms, which deflect the light rays from the first source towards the display face, a first series of prisms being orientated towards the first light source to deflect the light rays from the first source and a second series of prisms being orientated towards the second light source to deflect the light rays from the second source, and in that the prisms are selectively distributed in the zones of the light guide, which are located underneath the electrodes, such that the light rays emitted by the light sources are distributed and concentrated on the electrodes.

Owing to the display device according to the invention, it is possible to make an economical multi-coloured display device. Indeed, this display device enjoys a backlighting system with a high light output since most of the light emitted by the light sources is used for lighting portions of the patterns. Luminous energy is not wasted lighting zones of the cell not used for the display.

According to an advantageous embodiment, the first series of prisms is arranged underneath a first series of electrodes, and the second series of prisms is arranged underneath a second series of electrodes distinct from the first series. Thus, the control circuit for the backlighting device can be very simple. Indeed, the colour of the figurative patterns is determined by construction. Thus, the light sources need simply to be all switched on simultaneously and the figurative patterns are displayed in predefined colours.

According to another advantageous embodiment, at least one electrode corresponding to a figurative pattern, called a multi-coloured pattern, is arranged above prisms belonging to the first and second series, so as to allow the multi-coloured pattern to be selectively displayed in:
- a first colour corresponding to the prisms of the first series, when the first light source is on and the other light source is off;
- a second colour corresponding to the prisms of the second series, when the second light source is on and the other light source is off;
- a combination of colours when both sources are simultaneously on.

According to a first version of this embodiment, the prisms of the first and second series are interlaced underneath the electrode corresponding to the multi-coloured pattern so that simultaneously switching on both light sources produces a new colour corresponding to the superposition of the two initial colours.

According to a second version of this embodiment, the prisms of the first series and the prisms of the second series are regrouped in distinct zones, underneath the electrode corresponding to the multi-coloured pattern, to allow the display of the multi-coloured pattern in several coloured zones when both light sources are simultaneously switched on.

This embodiment thus allows great freedom as to the design of the patterns to be displayed, without it being necessary to provide a complex control circuit, since one light source need only be switched on or off.

Preferably, the figurative patterns are characters and each electrode has the shape of a character segment, which simplifies the making of the display device and the control thereof.

Advantageously, an absorbing polarizer of the transflective type is arranged on the bottom face of the liquid crystal cell and a reflective polarizer of the transmissive type is arranged above the light guide and the absorbing polarizer. Moreover a reflective polarizer of the transmissive type is arranged above the liquid crystal cell. Owing to these reflective polarizers, a better contrast is obtained between the figurative patterns displayed and the background on which they appear. Moreover, these reflective polarizers make the figurative patterns that are not selected invisible to the observer.

Preferably, the light guide has the shape of a plate, which facilitates arrangement of the latter underneath the liquid crystal display cell by minimising its space requirement. An optical diffusion film arranged on the top face of the light guide allows homogenous lighting of the figurative patterns to be obtained.

The present invention thus proposes a timepiece characterized in that it comprises a display device according to one of the preceding features. A timepiece, such as a watch, can thus be made with a multi-coloured display that enjoys low energy consumption, and does not require a complex control circuit.

Advantageously, the timepiece includes a printed circuit board on which are mounted light emitting diodes that form the light sources of the display device, and the light guide is arranged above the printed circuit board. A timepiece with small axial thickness, which is easy to assemble, is thus obtained by using a minimum of components and a minimum of assembly operations.

BRIEF DESCRIPTION OF THE DRAWINGS

Other features and advantages of the present invention will appear more clearly upon reading the following detailed description, made with reference to the annexed drawings, given by way of non-limiting example and in which.

DETAILED DESCRIPTION OF THE ILLUSTRATIVE EMBODIMENTS

Figure 1:
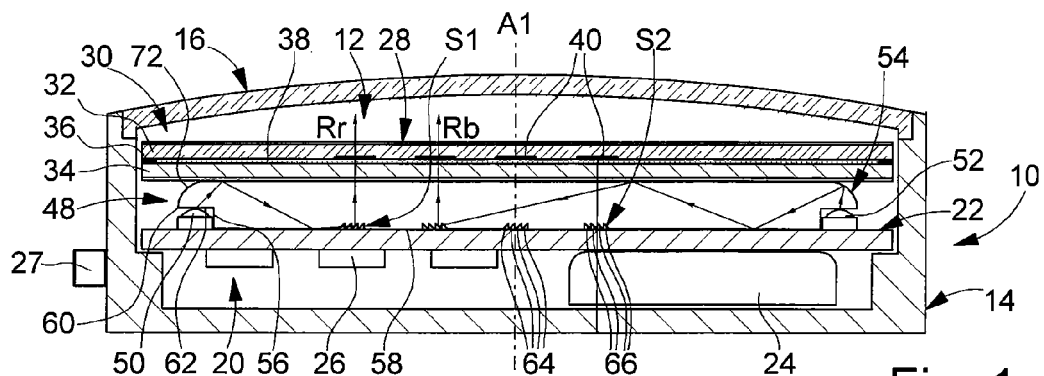
FIG. 1 is an axial cross-section which shows schematically a timepiece fitted with a display device in conformity with the teaching of the invention and in accordance with a first embodiment.

In the following description, elements that are identical or similar will be designated by the same reference numerals.

FIG. 1 shows schematically a timepiece 10 such as a wristwatch fitted with a liquid crystal display device 12 made in accordance with the teaching of the invention.

Timepiece 10 comprises a case 14, of overall cylindrical shape of axis A1, the top part of which is closed by a protective crystal 16 allowing a user to consult the indications displayed by display device 12 arranged inside case 14.

In the following description, a vertical orientation along axis A1 will be used in a non-limiting manner.

Case 14 contains an electronic control circuit 20, which is arranged here on the bottom face of a printed circuit board 22 and which is powered by a battery 24. Electronic circuit 20 includes, in particular, a control unit 26 for controlling display device 12 in order to display time related data or other data. External control means, such as a push-button 27, can be provided on the external face of case 14 to allow a user to operate electronic circuit 20.

Display device 12, whose display face 28 is orientated upwards, on the side of an observer, comprises a liquid crystal cell 30, which includes a top substrate 32, or front substrate, and a bottom substrate 34, or back substrate. The two substrates 32, 34, in the form of plates, are separated by a sealing frame 36, which defines a volume for confining liquid crystals 38. Cell 30 is preferably of the twisted nematic type.

Figure 2:
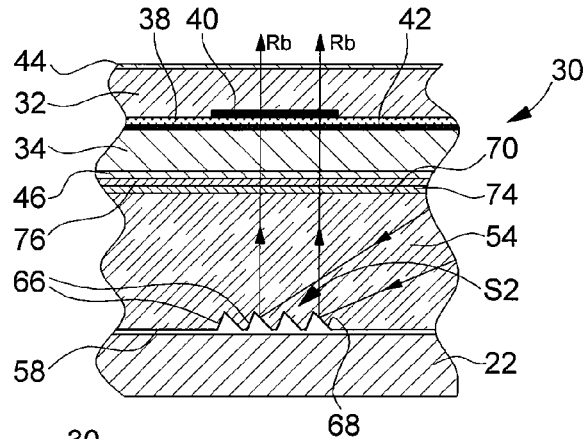
FIG. 2 is an enlarged view of a detail of FIG. 1.
Figure 3:
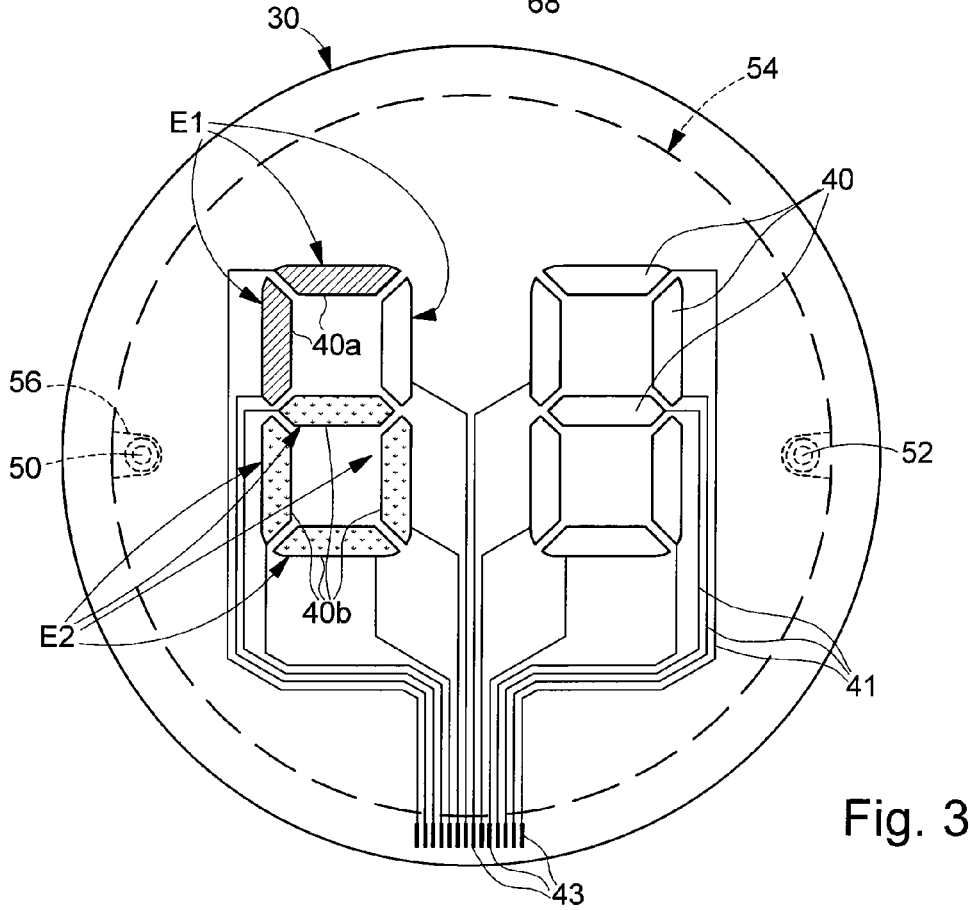
FIG. 3 is a top view which shows schematically the liquid crystal display cell of the display device of FIG. 1 and its electrodes.
Figure 4:
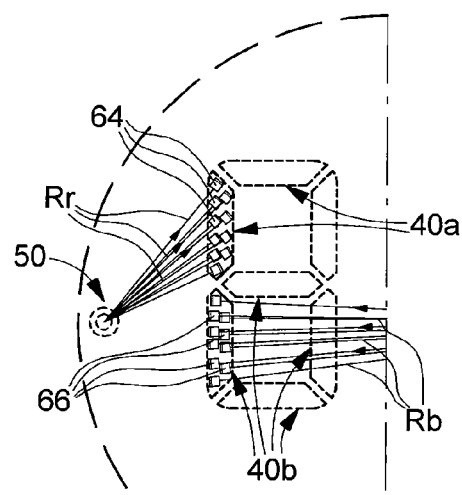
FIG. 4 is an enlarged top view which shows schematically one portion of the light guide fitted to the display device of FIG. 1 and which illustrates the position of the reflection prisms.

The structure of cell 30 is illustrated in particular in FIGS. 2 and 3.

Cell 30 comprises a series of electrodes 40, which are structured on the bottom face of top substrate 32, and a counter-electrode 42 in the shape of a plate, which is structured on the top face of bottom substrate 34.

Each electrode 40 represents a portion of a figurative pattern. According to the embodiment shown, each electrode 40 has the shape of a rectilinear segment, and these segments are arranged to form two figures "8", which enables all of the figures from "0" to "9", as well as certain letters, to be shown by selecting the segments displayed at any given moment in an appropriate manner.

Of course, according to variants (not shown) of the invention, electrodes 40 could have more complex shapes, for example one electrode 40 could, by itself, represent a single character, symbol or decorative pattern such as a flower.

Each electrode 40 is connected to an electric supply path that includes, at the end opposite electrode 40, a contact zone 43 for electrically connecting, via connection means (not shown), such as Zebra connectors, electrode 40 to the electric control circuit 20. Contact zones 43 of all of electrodes 40 are aligned here to facilitate this connection. Paths 41 and contact zones 43 are structured on the inner face of top substrate 32 like electrodes 40.

Similarly, counter-electrode 42 includes connection means (not shown) for the electrical connection thereof to electronic control circuit 20.

In a conventional manner, cell 30 includes a top polarising filter 44 and a bottom polarising filter 46, which are respectively arranged on the top face of top substrate 32 and the bottom face of bottom substrate 34. The light polarisation planes of these two filters 44, 46 form between them an angle of ninety degrees.

Advantageously, a reflective type polarising filter, also called a reflective polarizer, forms top polarising filter 44 and the bottom polarising filter 46 is formed by an absorbing type polarising filter, also called an absorbing polarizer.

In this Application, a "reflective polarizer" means a polarising filter that reflects received light upwards, when it is arranged underneath another polarising filter and the two filters are crossed. With a cell operating in backlighting mode, this type of filter enables segments of the colour of the ambient light to be displayed.

Conversely, an "absorbing polarizer" means a polarising filter that absorbs the light received from above, when it is arranged underneath another polarising filter and the two filters are crossed. With a cell operating in non-backlighting mode, this type of filter enables dark grey segments to be displayed.

Moreover, top polarising filter 44 is chosen from among transmissive type reflective polarizers, i.e. it is provided in order to allow light to pass in both directions.

Bottom polarising filter 46 is chosen from among transflective type absorbent polarizers with a reflective layer arranged on the side of its bottom face to reflect light upwards. Thus, in the non-backlighting mode, the ambient light that passes through cell 30 is reflected on bottom polarising filter 46 and, in backlighting mode, the light emitted by a backlighting module 48, located underneath cell 30 passes through bottom polarising filter 46 in the direction of display face 28.

Cell 30 is controlled by control unit 26 that applies a control voltage of a determined value between a selected electrode 40 and counter-electrode 42 so as to alter the orientation of the liquid crystals and cause the display of the corresponding figurative patterns.

Backlighting module 48 is arranged underneath liquid crystal cell 30, on the opposite side to display face 28. It includes here first and second light sources 50, 52 of different colours, which emit light rays Ri inside a light guide 54 in the shape of a plate. The first light source 50 emits for example red rays Rr, and the second light source 52 emits for example blue rays Rb.

Of course, backlighting module 48 can comprise more than two light sources 50, 52. In such case, several light sources 50, 52 could be the same colour.

According to the embodiment shown here, the light sources 50, 52 are formed by coloured light-emitting diodes 50, 52 which are mounted on the top face of printed circuit board 22 and which are electrically connected to electronic control circuit 20. These diodes 50, 52 are provided to produce a light beam that generally follows an axial direction orientated upwards. Each diode 50, 52 is received in a notch 56 arranged in the bottom broad face 58 of light guide 54, in proximity to the peripheral edge 60 of light guide 54, so that most of the light rays emitted by each diode 50, 52 penetrates light guide 54 through an adapted entry surface 62.

In accordance with the teaching of the invention, one face of light guide 54, here its bottom face 58, is provided with prisms 64, 66, which deflect light rays Ri emitted by diodes 50, 52 towards display face 28. A first series S1 of prisms 64 is orientated towards first diode 50 to deflect light rays Rf from first diode 50 and a second series S2 of prisms 66 is orientated towards the second diode 52 to deflect light rays Rb from the second diode 52.

Prisms 64 66 are formed here by recesses arranged in the bottom face 58 of light guide 54. Each prism 64, 66 includes a reflection surface 68 whose normal corresponds to the bisector of the angle formed by a first straight line, passing through the reflection surface 68 and the corresponding diode 50, 52, with a second straight line, passing through the reflecting surface 68 and the eye of the observer. Thus, a certain proportion of the light rays Ri emitted by each diode 50, 52 reaches the reflection surface 68 of the associated prisms 64, 66, either in direct incidence, or after one or more prior reflections on at least one of the bottom and top broad surfaces 58 and 70 of light guide 54.

Light rays Ri which reach reflection surface 68 are reflected upwards in accordance with the principle of total reflection, given their angle of incidence, which produces a backlighting light beam emitted towards display face 28 through cell 30.

The proportion of light rays Ri which are reflected on reflection surface 68 can be adjusted as a function of certain geometrical parameters of a given prism 64, 66, in particular as a function of the distance separating the associated diode 50, 52 from reflection surface 68 and as a function of the height of prism 64, 66 relative to the thickness of light guide 54. Those skilled in the art will not encounter any particular difficulty in adapting these parameters as a function of his requirements.

In FIG. 2, the angle between reflection surface 68 and the bottom broad surface 58 is substantially forty-five degrees, such that light rays Ri are deflected along a substantially axial direction.

Light guide 54 can be made of any material having the required qualities, including in particular transparency as regards the propagation of light, particularly within the visible range. Preferably, light guide 54 could be made of a PMMA (methyl polymetacrylate) type plastic material, by injection, replication, or by any other suitable method, the advantages of these solutions mainly residing in the facility of the corresponding manufacturing methods and in the low cost price of the finished product for large scale manufacture.

Using current manufacturing techniques, one could envisage making prisms 64, 66 having dimensions of the order of 10 μm. Moreover, the reflection surface 68 could take various flat or curved shapes, for modulating the shape of the reflected beam and making it slightly divergent, for example.

According to a variant (not shown), prisms 64, 66 could project over one of the broad faces 58, 70 of light guide 54.

Advantageously, the peripheral portion 72 and top face 70 of light guide 54 is curved towards the bottom face 58, such that the light rays emitted by diodes 50, 52 towards peripheral edge 60 of light guide 54 can be totally reflected onto the peripheral portion 72 and thus deflected towards prisms 64, 66 arranged in the central part of light guide 54.

Of course, according to a variant (not shown), diodes 50, 52 could be provided for transmitting light radially towards axis A1. Diodes 50, 52 would then have to be arranged radially opposite an axial entry surface 62.

According to another feature of the invention, prisms 64, 66 are distributed in zones of light guide 54 that are located underneath electrodes 40, such that the light rays R1 derived from the top face 70 of light guide 54 are concentrated on electrodes 40. Thus, prisms 66 reproduce overall the contour of electrodes 40 on bottom face 58 of light guide 54.

Prisms 64, 66 are located solely facing electrodes 40. Outside the zones located underneath electrodes 40, light guide 54 does not comprise any prisms 64, 66. Consequently, light guide 54 transmits light rays Ri solely upwards facing electrodes 40.

According to a first embodiment, shown in FIGS. 1 to 4, the first series S1 of prisms 64 is arranged underneath a first series E1 of electrodes 40, and the second series S2 of prisms 66 is arranged underneath a second series E2 of electrodes 40 distinct from the first series. Thus, each electrode 40 can only be lit by a single diode 50, 52 and the backlighting colour thereof corresponds to the colour of the diode 50, 52 which lights it.

Preferably, an optical diffusion film 74 is arranged on the top face 70 of light guide 54. This optical film 74 is used for diffusing the light emitted by light guide 54 transversely above prisms 64, 66 and to light each electrode 40 homogenously.

According to variants, optical film 74 could be a focussing or structuring film for the light transmitted by light guide 54, depending upon the backlighting effect sought.

Advantageously, cell 30 comprises a bottom transmissive type reflective polarizer, which is inserted between the bottom polarising filter 46 and optical film 74. The function of this bottom reflective polarizer 76 will be explained hereinafter.

Display device 12 according to the first embodiment operates as follows.

In the non-backlighting mode, also called the reflective mode, the backlighting module 30 is not powered and the ambient lighting is used to obtain a contrast between the displayed segments, which correspond to powered electrodes 40, and the non-displayed segments, which corresponds to non-powered electrodes 40. The operation of display device 12 is conventional and the displayed segments corresponding to powered electrodes 40 appear in the colour of the ambient lighting.

The light from the ambient lighting passes through the top polarizing filter 44 then cell 30 before being reflected onto the reflective layer of the bottom polarizing filter 46, then returning along the same path in the opposite direction towards display face 28.

In the backlit mode, backlighting module 30 is powered and the segments corresponding to powered electrodes 40 each appear in a determined colour.

In the backlit mode, the two diodes 50, 52 are simultaneously lit. Consequently, light guide 54 emits red light rays Rr under electrodes 40 of the first series E1 and blue light rays Rb under the electrodes 40 of the second series E2.

When electronic circuit 20 powers a determined electrode 40 to display the corresponding segment on the side of display face 28, the liquid crystals located underneath this electrode 40 are orientated so as to allow the light emitted by the backlighting module 48 pass under this electrode 40.

For example, in FIG. 3, the character "6" is displayed by powering electrodes 40a, 40b corresponding to the display of this character. Since electrodes 40a belong to the first series E1, the two corresponding segments are displayed in red since prisms 64 located underneath those segments are orientated towards red diode 50. Since electrodes 40b belong to the second series E2, the four corresponding segments are displayed in blue since prisms 66 located underneath these segments are orientated towards blue diode 52.

According to this embodiment, each display segment is always lit by the same diode 50, 52.

Figure 5:
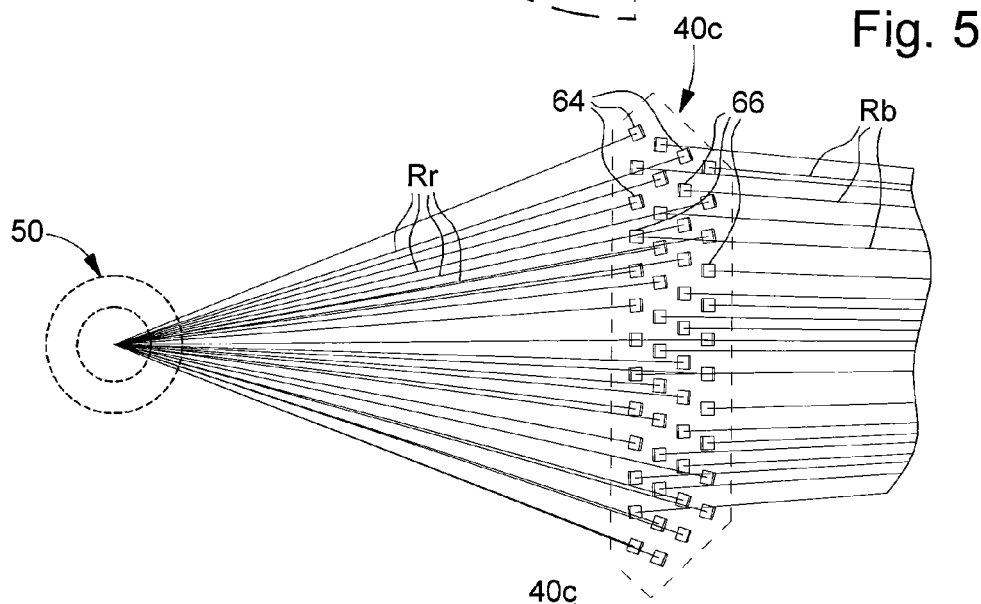
FIG. 5 is a similar view to the preceding one which shows schematically a second embodiment of the invention comprising a multi-coloured display segment.

According to a second embodiment, which is shown in FIG. 5, at least one electrode 40c corresponding to a multicoloured segment is arranged above prisms 64, 66 belonging to the first series S1 and to the second series S2. Moreover, prisms 64, 66 of the first series S1 and the second series S2 are interlaced. Thus, this embodiment enables the multicoloured segment to be selectively displayed in several colours depending upon which diodes 50, 52 are lit.

When the red diode 50 is lit and the blue diode 52 is not lit, and the electrode 40c corresponding to the multicoloured segment is being powered, the multicoloured segment is lit in red.

When the blue diode 52 is lit and the red diode 50 is not lit and the electrode 40c corresponding to the multicoloured segment is being powered, the multicoloured segment is lit in blue.

When both diodes 50, 52 are simultaneously lit, and the electrode 40c corresponding to the multicoloured segment is being powered, the red light and the blue light of the two diodes 50, 52 mix to display the multicoloured segment in magenta.

Figure 6:
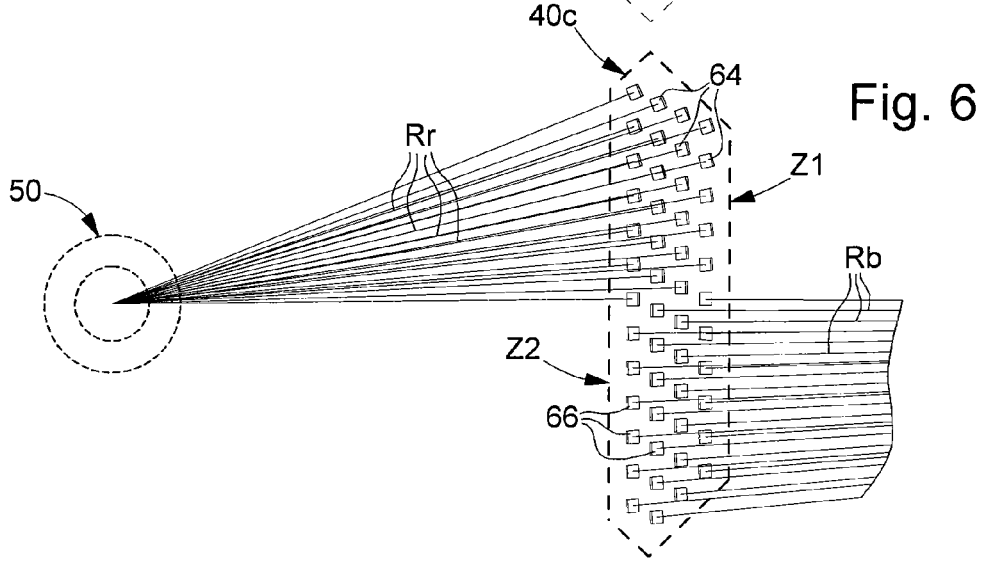
FIG. 6 is a similar view to the preceding one which shows schematically a variant of the second embodiment wherein the multi-coloured segment comprises several coloured zones.

According to a variant of the second embodiment, illustrated by FIG. 6, the prisms 64 of the first series S1 and the prisms 66 of the second series S2 are regrouped in distinct zones Z1, Z2, underneath the electrode 40c corresponding to the multicoloured segment, to allow the multicoloured segment to be displayed in several coloured zones Z1, Z2 when the two diodes 50, 52 are simultaneously lit. This embodiment allows a large variety in the appearance of the multicoloured segments, which can appear with multicoloured stripes or with multicoloured circles.

Of course, the two embodiments previously described can be combined so that certain segments are multicoloured and others are displayed in a single colour.

The use of a reflective polarizer for the top polarising film 44 has the advantage of improving the light output, and thus the brilliance of the displayed segments, since it allows more light to pass than an absorbing type filter.

Moreover, the outwardly reflective effect of top polarising filter 44 decreases the visibility of the non-displayed segments for the observer. Indeed, it is to be noted that the visual effect obtained by means of the top polarising filter 44 prevents the observer from distinguishing the low quantity of light that manages to pass through cell 30 at the non-powered electrodes 40.

In the backlit mode, the bottom reflective polarizer 76 also decreases the visibility of the non-displayed segments. Indeed, when light guide 54 emits light underneath all of electrodes 40, including the non-powered electrodes 40, a certain quantity of transmitted light manages to pass through cell 30 at the non-powered electrodes 40, which can make the non-selected segments visible to the observer. The bottom reflective polarizer 76 minimises this quantity of undesired light. This is due in particular to the reflection of one part of light rays Rr, Rb onto the bottom reflective polarizer 76.

The invention claimed is:

1. A liquid crystal display device including a display face orientated towards the top of the device, on the side of an observer, said device including:
    a liquid crystal cell including at least one top substrate and one bottom substrate, at least two electrodes and at least one counter-electrode which are structured on the opposite faces of the two substrates, each electrode representing a figurative pattern or a portion of a figurative pattern;
    a control unit which controls the liquid crystal cell by applying a control voltage of a determined value between a selected electrode and the counter-electrode so as to alter the orientation of the liquid crystals and cause the display of the corresponding figurative patterns, and
    a backlighting module arranged underneath the liquid crystal cell, on the side opposite the display face, including at least a first and a second light source of different colours which emit light rays inside at least one light guide,
    wherein the light guide includes a plurality of prisms which deflect the light rays towards the display face, a first series of prisms being orientated towards the first light source to deflect the light rays emitted by the first source and a second series of prisms being orientated towards the second light source to deflect the light rays emitted by the second source, and wherein the prisms are distributed in zones of the light guide which are located underneath the electrodes, so that the light rays coming from the top face of the light guide are concentrated on the electrodes.

2. The display device according to claim 1, wherein the first series of prisms is arranged underneath a first series of electrodes, and wherein the second series of prisms is arranged underneath a second series of electrodes distinct from the first series.

3. The display device according to claim 1, wherein at least one electrode corresponding to a figurative pattern called the multicoloured pattern is arranged above prisms belonging to the first and the second series, so as to allow the selective display of the multicoloured pattern in:
- a first colour corresponding to the prisms of the first series when the first light source is lit and the other is not lit,
- a second colour corresponding to the prisms of the second series, when the second light source is lit and the other is not lit,
- a combination of colours when both light sources are simultaneously lit.

4. The display device according to claim 3, wherein the prisms of the first and the second series are interlaced underneath the electrode corresponding to the multicoloured pattern so that simultaneously lighting both light sources produces a new colour corresponding to the superposition of the two initial colours.

5. The display device according to claim 3, wherein the prisms of the first series and the prisms of the second series are regrouped in distinct zones underneath the electrode corresponding to the multicoloured pattern, to display the multicoloured pattern in several coloured zones when both light sources are simultaneously lit.

6. The display device according to claim 1, wherein the figurative patterns are characters and wherein each electrode has the shape of a character segment.

7. The display device according to claim 1, wherein an absorbing polarizer of the transflective type is arranged on the bottom face of the liquid crystal cell and wherein a reflective polarizer of the transmissive type is arranged between the light guide and the absorbent polarizer.

8. The display device according to claim 1, wherein a reflective polarizer of the transmissive type is arranged above the liquid crystal cell.

9. The display device according to claim 1, wherein an optical diffusion film is arranged on the top face of the light guide.

10. The display device according to claim 1, wherein the light guide has the shape of a plate.

11. A timepiece, wherein it includes a display device according to claim 1.

12. The timepiece according to claim 11, wherein it includes a printed circuit board on which are mounted light emitting diodes which form the light sources of the display device, and wherein the. light guide is arranged above the printed circuit board.

13. The display device according to claim 2, wherein at least one electrode corresponding to a figurative pattern called the multicoloured pattern is arranged above prisms belonging to the first and the second series, so as to allow the selective display of the multicoloured pattern in:
- a first colour corresponding to the prisms of the first series when the first light source is lit and the other is not lit,
- a second colour corresponding to the prisms of the second series, when the second light source is lit and the other is not lit,
- a combination of colours when both light sources are simultaneously lit.

14. The display device according to claim 13, wherein the prisms of the first and the second series are interlaced underneath the electrode corresponding to the multicoloured pattern so that simultaneously lighting both light sources produces a new colour corresponding to the superposition of the two initial colours.

* * * * *